Sept. 25, 1951     T. BOREEN     2,569,283
LATCHING DEVICE FOR GONDOLA DUMPING DOORS
Filed July 28, 1947
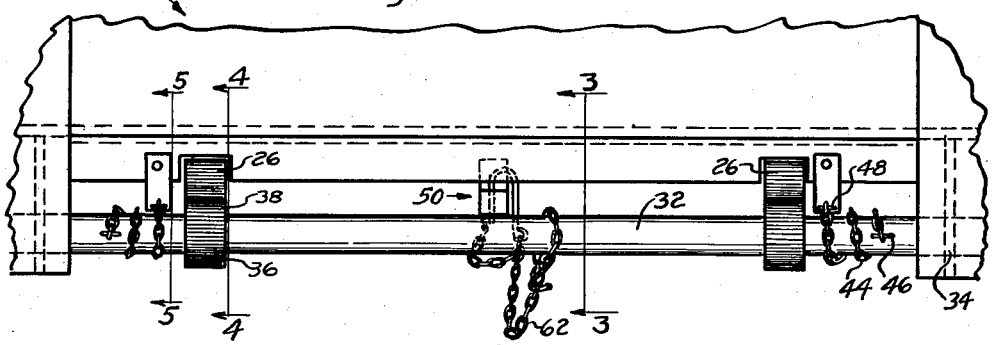
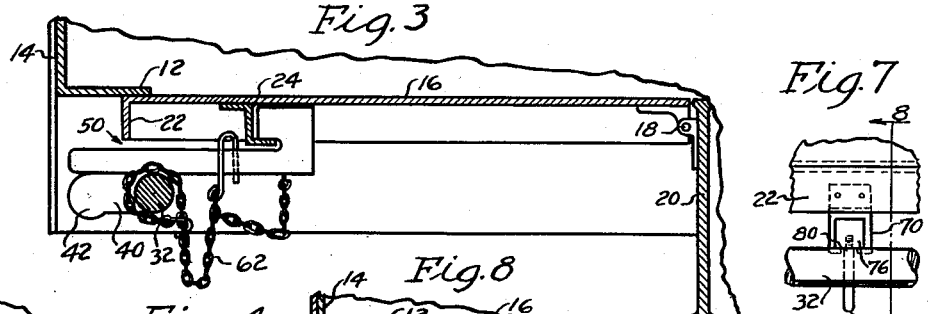
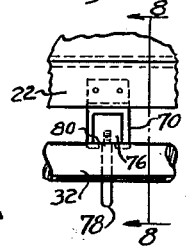
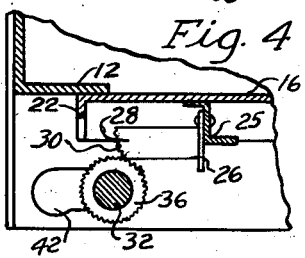
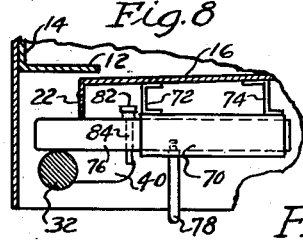
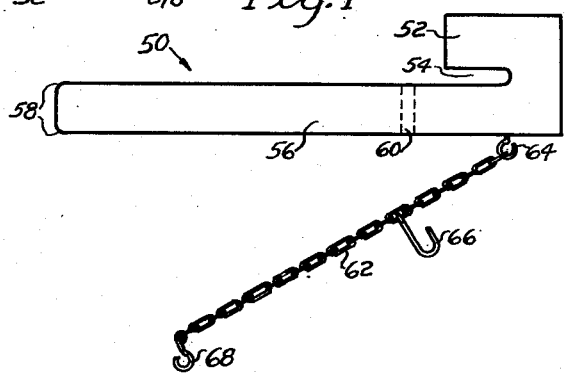
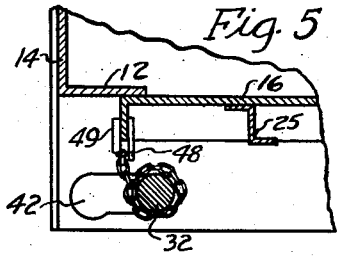
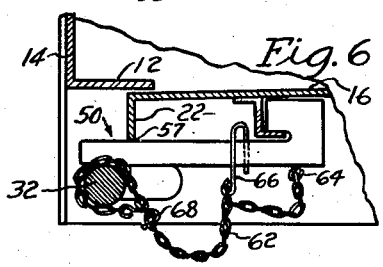
INVENTOR.
THORE BOREEN
BY
Attorney Patented Sept. 25, 1951

2,569,283

UNITED STATES PATENT OFFICE 2,569,283

LATCHING DEVICE FOR GONDOLA
DUMPING DOORS

Thore Boreen, Minneapolis, Minn.

Application July 28, 1947, Serial No. 764,092

6 Claims. (Cl. 105—309)

My invention relates to a latching device for use in conjunction with a selected cargo dumping door of a gondola type railway car for maintaining the door closed when the remainder of the doors of the car are moved to an open position.

In the practice of transporting certain types of heavy aggregates such as coal, gravel or sand, it is customary to load the material into an open topped railway car. Although there are several types of railway cars used for this purpose, a common type, and one to which the present invention is applicable, is a flat bottom car generally referred to as a gondola. In order that the cargo may be rapidly removed from a car of this type, its bottom surface is provided with a plurality of doors which are hinged along a center line so that the doors open from the bottom along the sides of the car. A mechanism is provided on the car for opening and closing the doors and takes the form of a heavy shaft that extends in a longitudinal direction along the undersurface of the car beneath the doors. This shaft carries a number of serrated wheels or gears, which cooperate with serrated stationary members resembling rack bars that are positioned on the surface of the doors. A pair of heavy chains are connected between the shaft and portions of each of the doors and these chains are arranged to be spirally wound about the shaft so as to make an extensible connection between the shaft and the door. When the door is opened as by rotating the shaft in one direction, the chain unwinds from the shaft and acts to limit the movement of the door. When the door is to be closed, as by rotating the shaft in an opposite direction, the chain is again wound about the shaft and acts to draw the door up to a point where the rack bar is brought into contact with the gear wheel, which thereafter becomes effective to forcibly move the door against the bottom of the car. In the normal arrangement of conventional cars of this type, the shaft simultaneously opens or closes a plurality of doors in a single operation. In the arrangement of some cars, the door opening shaft extends throughout the full length of the car and is capable of controlling the operation of as many as six or more doors simultaneously. In other arrangements the shaft is formed in two sections, each of which is operable from an opposite longitudinal end of the car. In this latter case, each of the shafts extends for only half of the linear distance of the car and is thus operable to control the movement of three or more doors simultaneously.

Under numerous circumstances, it is not always convenient to have all, or a substantial number of doors opened simultaneously, and a serious problem is presented in keeping the remainder of the doors closed. For example, when the cargo is coal, and a chute of relatively limited lateral dimension is provided for receiving the coal and conveying it away from the point where it is dumped from the car, it is advisable that only one or two doors be opened to dump the cargo, whereafter the car is moved and a second set of doors opened. Another example is where the cargo is sand or gravel used in repairing a railway road bed. Frequently it is desirable to dump only a limited quantity of the material at a single place along the track, whereafter the car is moved on to the next point at which material is needed. Under either of the circumstances set forth above, it will be readily apparent that where the door opening mechanism provides for simultaneously opening as many as six or more doors in a single operation, that definite steps must be taken to maintain the remainder of the doors closed. A common means of preventing all but the selected number of doors from being opened at one time has been to place heavy wooden props into place between the ground and those doors which are to remain closed so that they will maintain the doors closed while the other selected doors are open. If it becomes necessary to open additional doolrs which have been propped, as previously described, a selected prop is driven from its upright position, which is a rather difficult task since the prop in addition to maintaining the door closed, is also supporting the entire weight of the aggregate resting on the door. This is a highly unsafe practice since the prop is under great tension and the practice has been the cause of a great number of serious accidents to the workers who engage in this form of work. Furthermore, when several doors are sealed with props and the car must be moved to a new position, considerable time is lost in again properly sealing all of the doors before the car can be moved from the position in which the original dumping operation took place.

I have discovered that a relatively simple latching device may be mounted between the door and the door opening mechanism of each of the selected doors which are to remain closed. The latching device is constructed to slidably engage a portion of the door so as to form a relatively rigid continuation of the door but which may be easily and safely removed when the door is opened. In order that the latch may properly secure the door in closed position, it is provided with a portion that is adapted to rest on a part of the door opening mechanism and is constructed in such a manner that it may be easily removed with a single hammer blow to permit the door to drop to an open position. To prevent an accidental removal of the latch, it is provided with an aperture that is adapted to receive a safety device in the form of a pin which is constructed to protrude from the latch in a manner as to engage a part of the door should the latch receive a jolt of sufficient magnitude as to cause it to move to an unlatched position. To prevent loss of the latch when it is driven from its secured position, and to secure it against dangerous flight when so removed because of the tensions involved, a chain is provided which may be easily secured at one end to the latch and at the other end to a portion of the car. Although the latch as shown and disclosed herein may be removed from the car, it is within the scope of my invention that it may be made as a part of the permanent equipment of the car and remain with the car wherever the same is transported.

An object of my invention is to provide a latching device for use with a gondola type railway car for maintaining a selected cargo dumping door closed when the remainder of the doors are moved to an open position.

Another object is to provide a latching device for use on railway cars in which the latch forms a part of the permanent car equipment and is housed within a casing secured to the door.

Another object is to provide a latching device which is cooperable between a portion of a gondola cargo dumping door and a portion of the door opening mechanism, which is operable to maintain a selected door closed when the remainder are open.

Another object is to provide a latching device for securing a selected gondola door in a closed position, and a safety means to prevent accidental removal of the latch while it is in an operative position.

A further object is to provide in combination with a railway gondola car door having an L shaped bracket thereon, a J shaped latching device cooperable with the bracket for holding the door in a closed position, together with a safety means in the form of a pin which is cooperable between the bracket and the latch to prevent accidental removal of the latch.

Other and further objects will become apparent from the following description and claims, and in the appended drawings in which:

Fig. 1 is a side view of the latching device forming the present invention;

Fig. 2 is a side view of the lower portion of a gondola car showing the door controlling mechanism and the relationship of the device forming the present invention;

Fig. 3 is a sectional view taken on the lines 3—3 of Fig. 2;

Fig. 4 is a sectional view taken on the lines 4—4 of Fig. 2;

Fig. 5 is a sectional view taken on the lines 5—5 of Fig. 2;

Fig. 6 shows the parts of Fig. 2 with the device forming the present invention holding the door in a closed position when the normal door closing mechanism is in a position to permit the door to open;

Fig. 7 is a side view corresponding to Fig. 1, of a modified form of latching device; and, Fig. 8 is a section taken on the lines 8—8 of Fig. 7.

Referring now to the several views of the drawing, the invention will be described in detail.

Referring to Fig. 2, general reference numeral 10 indicates a portion of a gondola type railway car as seen from an exterior side. As shown in the several views, the lower outer extremity of the car is formed of an angular plate 12 which extends inwardly for a short distance from the outer edge 14 of the car. A cargo dumping door 16 is hingedly mounted at 18 on a heavy I beam 20 which extends along a center line of the car. At its outer extremity, the door is provided with a flange 22 which abuts the under surface of plate 12 when the door is in a closed position. Extending in a longitudinal direction of the car and immediately in back of flange 22 is a bracket 24 which takes the form of a Z shaped bar. The bracket or Z bar 24 is provided on the under surface of the door as a supporting means to render the door relatively rigid. An important feature of the bracket 24 is that it is provided with a vertical portion and a lower horizontal portion 25. Thus the bracket 24, instead of having a Z shape, might be either a channel or an I beam, but in either instance, it would still have a depending L shaped portion 25. As is shown in Figs. 2 and 4, a pair of relatively heavy brackets 26 are mounted on a vertical part of the L shaped portion 25 and have on their forward edges a curved surface 28 with a plurality of serrations 30 so that the forward surface 28 in reality constitutes a form of curved rack bar.

Extending in a longitudinal direction with respect to the car is a relatively heavy shaft 32 which is journaled at 34 on the under surface of the car in a slot to be described hereinafter. Shaft 32 carries a plurality of wheels 36 having serrations 38 on the outer surfaces thereof which cooperate with the serrations 30 on the curved surface 28 of members 26. As shown in Figs. 3–6, shaft 32 fits within an elongated slot 40 which has a circular recessed portion 42 at its forward edge. A pair of chains 44 are each connected at one end 46 to shaft 32 and at their other end 48 to a bracket 49 which depends from the angular surface 22 of door 16.

The foregoing discussion all relates to standard parts of a conventional gondola car and in the ordinary practice of opening the dumping door 16 which is one of several doors extending on either side of the car, shaft 32 is rotated in a clockwise direction as shown in Figs. 3–6. The cooperative action between the serrations 38 on the wheels 36, and the serrations 30 on the curved surface 28 causes shaft 32 to slidably move forward in slot 40 from the position shown in Figs. 3–5, in the direction of the recessed portion 42, Fig. 6, disengaging wheels 36 from members 26. When this occurs, the door will drop slightly but is still snubbed by the chain which is spirally wound about shaft 32. Continued rotation of shaft 32 in a clockwise direction unwinds the chain from the shaft and permits the door to move to a fully open position. Since the positions of a plurality of doors are all simultaneously controlled by the action of the one shaft, these doors may all be moved to an open position at one time and the contents of the car above the several doors emptied by gravity in a relatively short period of time. Under certain circumstances, however, it may be desirable to only open one of the several doors to dispose of a limited quantity of the material within the car and for this purpose, the device, to be disclosed hereinafter, finds particular utility.

Referring now to Fig. 1, is shown a latching device indicated by the general reference numeral 50 which consists of a relatively heavy bar of metal that is rectangular in cross section and is provided at one end with a head 52. A slot 54 is formed between head 52 and an elongated portion 56. At one end the portion 56 is formed with curved edges 58. An aperture 60 extends through the portion 56 a short distance away from the head portion 52. A chain 62 is attached to portion 56 by an eye bolt 64 and carries a first hook 66 and a second hook 68. Member 50 may be described as taking the form of a reversed letter J which will be evident in Fig. 1 is rotated clockwise through an angle of 90°. As will be evident in Figs. 3 and 6, member 50 forms a cooperative link between the Z bar 24 and the shaft 32. The lower surface of the L shaped portion 25 extends into the slot 54 and the head portion 52 occupies substantially all of the area between the under surface of the door and the L shaped portion 25. The forward end of portion 56 extends to about the forward end of slot 40. When the shaft 32 is in its forward position in the recess 42 of slot 40, Fig. 6, the brackets 26 and wheels 36 are no longer operative to hold the door tight against surface 12 and in this condition the flange 22 rests on member 50 at the point 57 which is just in rear of shaft 32. Thus in this position the forward end of the door is resting entirely on member 50 at the point 57 as clearly shown in Fig. 6, and member 50 in turn rests upon shaft 32.

In operation, when it is desired to maintain a selected door 16 in a closed position while the remainder of the doors of car 10 are to be opened, the device 50 is placed as shown in Figs. 2 and 3 with the slot 54 surrounding the lower extremity of Z bar 24 and the portion 56 resting on the top of shaft 32. The chain 62 loosely encircles shaft 32 and is held in place by hook 68 which engages one of the links of chain 62. Hook 66 is inserted through the aperture 60 in member 50 in rear of flange 22 and in front of the vertical portion of Z bar 24. Shaft 32 is rotated in a clockwise direction by a manually controlled means extending from the end of the car. Rotation of the shaft in this manner causes the shaft to slidably move forward in slot 40 thereby disengaging wheels 36 from brackets 26. When this occurs, door 16 will no longer be held in rigid contact with surface 12 since the means of holding the door in a rigid condition consists of cooperating efforts of wheels 36 and brackets 26, and the door will move downwardly for a small distance until flange 22 rests on member 50 at the point 57 as shown in Fig. 6. If it is desired to thereafter permit door 16 to be dropped to its open position, shaft 32 is further rotated until chains 44 are completely free and hook 66 is removed from aperture 60 in which position it previously acted to engage the forward surface of the Z bar 24 to prevent the member 50 from being accidentally disengaged from its position on shaft 32. Then, by a heavy blow from a sledge hammer or the like, member 50 is driven inwardly or to the right as shown in Fig. 6 causing the head portion 52 to be disengaged from Z bar 24 and causing the edges 58 on the forward end of portion 56 to slide over the shaft 32 on its inner edge. When this occurs, door 16 will drop to the full extent that it is permitted to move by chain 44, passing in the rear of shaft 32. Chain 62 will act to prevent member 50 from developing dangerous flight as a result of its being freed of the enormous weight which has been resting on it, and will also prevent member 50 from being carried away with the loose aggregate descending from door 16.

After the cargo has been dumped, the doors may be closed by rotating shaft 32 in a counter clockwise direction. Rotation of the shaft causes the chains 44 to spirally wind themselves about the shaft and thus lift the doors to a point where the uppermost serrations 30 on the forward curved surfaces 28 of the several rack bars or brackets 26 are brought in line with the serrations 38 of wheels 36. As the shaft is further rotated the chains 44 bring these members in contact with each other so that the door is finally moved firmly against the lower surface of plate 12 by the actions of the serrations or gear teeth on wheels 36 acting on the serrations or gear teeth on rack bars 26.

Referring now to Figs. 7 and 8, is shown a modified form of the invention wherein a latching device forms a permanent part of the car equipment. A housing 70 is secured on the under surface of door 16 by means of suitable supporting brackets 72 and 74. Within the interior of housing 70 is a latching device 76 which carries on its under surface a manually operable handle 78 suitably secured to member 76. The housing 70 is slotted at 80 on its under surface so as to provide for longitudinal movement of the handle 78 when the latch is moved within the housing 70. A pin 82 is slidably mounted in an aperture 84 of the latching device 76 and serves identically the same purpose as hook 66 and aperture 60 of Fig. 1.

In operation, the disclosure of Figs. 7 and 8 is intended to provide a modified form of latching device which serves substantially the same purpose as member 50 disclosed heretofore. The structure differs from member 50 in that it is intended to provide a latching mechanism which is permanently secured to the under surface of the car. In its inoperative position, member 76 is carried within housing 70 with the handle 78 in a rearward position in slot 80, or moved to the right from the position shown in Fig. 8. When it is desired to latch one of the doors 16 in a closed position prior to moving shaft 32 to its forward position, handle 78 is pulled forward so as to bring the forward end of member 76 in engagement with the upper surface of shaft 32. The door is unlatched in its usual manner as described heretofore, whereupon the weight of the door is borne by the latching device 76 as described heretofore. When it is desired to unlatch the mechanism, pin 82 is removed, and if desired, pin 82 may be secured by a chain to the housing 70 by means not shown, such as a chain similar to chain 62. Thereafter, member 76 is driven from its holding position in substantially the same manner as previously described in the operation of member 50.

A particular advantage of my invention is that a plurality of the devices described herein may be used with a single car whose doors are to be consecutively opened and each of the devices driven from its secured position to open the selected door.

Another advantage is that the device is relatively easy to put into position, and since it contributes to the personal safety of the workmen, it will receive their ready cooperation.

A further advantage is that the device is relatively inexpensive to manufacture and will afford a great saving to the employer in that it saves considerable time and will materially aid in reducing accidents.

As numerous changes may be apparent to those skilled in the art, my invention is defined in the terms of the appended claims.

I claim:

1. In combination with a railway gondola car embodying a hingedly mounted drop bottom door and a door locking shaft which extends longitudinally of the car beneath the door and adjacent its outer edge and which is bodily movable between a first position when the door is locked and a second position when the door is permitted to open, and means for temporarily maintaining the door closed when the shaft is moved from the first position to the second position, comprising a bar supported on the under side of the door and extending outwardly in contact with the upper surface of the shaft and beyond the shaft when the same is in its first position for a distance equal to the extent of lateral movement of the shaft, the under side of said bar from the point where it initially contacts said shaft when the latter is in its first position to the outer end of the bar forming an unobstructed plane surface for continuously contacting the shaft as the same is moved, to thereby support the door on said shaft when the shaft is in either of its positions.

2. In combination with a railway gandola car embodying a hingedly mounted drop bottom door and a door locking shaft which extends longitudinally of the car beneath the door and adjacent its outer edge and which is bodily movable between a first position when the door is locked and a second position when the door is permitted to open, means for temporarily maintaining the door closed when the shaft is moved from its first position to the second position, comprising a bar supported on the under side of the door and extending outwardly in contact with the upper surface of the shaft and beyond the shaft when the same is in its first position for a distance equal to the extent of lateral movement of the shaft, the under side of said bar from the point where it initially contacts said shaft when the latter is in its first position to the outer end of the bar forming an unobstructed plane surface for continuously contacting the shaft as the same is moved to thereby support the door on the shaft when the latter is in either of its positions, said bar being adapted for slideable movement inwardly from the shaft when the latter is in its second position to permit the door to move to an open position, and a removable latch carried by the bar forward of the point where the bar is supported on the door to prevent accidental sliding movement of the bar.

3. In combination with a railway gondola car having a drop bottom door on its lower surface which is hingedly supported adjacent the center of the car and which is in a normally closed position for supporting a cargo within the car, a locking shaft extending longitudinally of the car beneath the door and adjacent its outer edge, means supporting said shaft for lateral bodily movement between a first position beneath the door for maintaining the same in a closed position and a second position beyond the outer edge of the door wherein said door is permitted to move to fully open position for discharging the cargo, and means for temporarily maintaining said door closed and supporting the cargo resting thereon, comprising a linear bar supported on the under side of the door and extending in a plane transverse to the shaft outwardly above the shaft when the same is in its first position, the dimensions of said bar being such that the outer end thereof extends beyond the outer edge of the door for a distance which is at least equal to the range of lateral movement of the shaft to initially engage the upper surface of said shaft at one point when the latter is in its first position and maintain a continuous contact therewith as the same is moved outwardly to its second position to thereby continuously support the door and the cargo on said shaft while the latter is moved, said bar being adapted to be moved inwardly relative to the shaft to thereby permit the door to drop to an open position.

4. In combination with a railway gondola car having a drop bottom door on its lower surface which is hingedly supported adjacent the center of the car and which is in a normally closed position for supporting a cargo within the car, a locking shaft extending longitudinally of the car beneath the door and adjacent its outer edge, means supporting said shaft for lateral bodily movement between a first position beneath the door for maintaining the same in a closed position and a second position beyond the outer edge of the door wherein said door is permitted to move to fully open position for discharging the cargo, means for temporarily maintaining said door closed and supporting the cargo resting thereon, comprising a linear bar supported on the under side of the door and extending in a plane transverse to the shaft outwardly above the shaft when the same is in its first position, the dimensions of said bar being such that the outer end thereof extends beyond the outer edge of the door for a distance which is at least equal to the range of lateral movement of the shaft to initially engage the upper surface of said shaft at one point when the latter is in its first position and maintain a continuous contact therewith as the same is moved outwardly to its second position to thereby continuously support the door and the cargo on said shaft while the latter is moved, said bar being adapted to be moved inwardly relative to the shaft to thereby permit the door to drop to an open position, and latching means carried by the bar and engageable with a portion of the door structure to prevent said bar from being moved inwardly relative to the shaft when the latter is in its second position and the bar is supporting the door thereon.

5. In combination with a railway gondola car embodying a hingedly mounted drop bottom door having an L-shaped bracket extending across its lower surface in a plane parallel with the outer edge of the door and a door locking shaft which extends beneath the door adjacent its outer edge and which is movable in a lateral direction with respect to the outer edge of the door between a first position when the door is locked and a second position when the door is permitted to open, means for temporarily latching the door in a closed position when the shaft is laterally moved from its first position to its second position consisting of a latch bar which is recurrently bent at one end in the form of a hook for engaging a portion of the L-shaped bracket, and a linear portion which extends away from the hook and is adapted to rest on the upper surface of the shaft, said bar having an aperture therein spaced from the recurrently bent end, a pin which is adapted for insertion in said aperture for engaging a portion of the L-shaped bracket to prevent accidental movement of the bar when the same is maintaining the door in a closed position, and an extensible member connected between said pin and a portion of the bar and which is adapted to extend around a portion of the shaft to prevent uncontrolled movement of the bar when the same is moved from engagement with the shaft.

6. In combination with a railway gondola car, a door hingedly supported on the under side of a car and when in a closed position supports a cargo within the car on its upper surface, an angularly shaped bracket mounted on the under surface of the door adjacent its outer edge, a locking shaft extending longitudinally of the car beneath the lower surface of the door and adjacent its outer edge, means supporting said shaft for lateral bodily movement between a first position beneath the door for maintaining the same in a closed position and a second position beyond the outer edge of the door whereby said door is permitted to move to an open position, means for temporarily maintaining said door in a closed position when the locking shaft is moved from its first position to its second position, comprising a bar having one end recurrently bent upon itself to form a slot at one end of the bar to engage a portion of the angular bracket and support the bar on the under side of the door, the remainder of said bar extending outwardly above the locking shaft when the latter is in its first position for a distance equal to the range of movement of the locking shaft, the under surface of the remaining portion of the bar forming a continuous contact with the outer surface of the shaft to support the door thereon when the shaft is moved between its first and second positions, said bar having a vertical aperture spaced forward from the bent portion, said bar being adapted for sliding movement relative to the bracket and the locking shaft to drop the door to open position, and a safety lock adapted for removable mounting in said aperture for engaging a portion of the bracket when the bar is supported thereon to prevent the bar from being dislodged from the bracket.

THORE BOREEN.

REFERENCES CITED

The following references are of record in the file of this patent:

UNITED STATES PATENTS

| Number | Name | Date |
| --- | --- | --- |
| 932,728 | Tesseyman | Aug. 31, 1909 |
| 937,100 | Seaberg | Oct. 19, 1909 |
| 986,207 | Otis | Mar. 7, 1911 |
| 1,026,785 | Bowling | May 21, 1912 |
| 1,244,698 | Cherbonnier | Oct. 30, 1917 |
| 1,311,561 | Hosceit | July 29, 1919 |
| 1,386,406 | Hindahl | Aug. 2, 1921 |
| 1,388,950 | Hosceit | Aug. 30, 1921 |
| 1,548,903 | Reisse | Aug. 11, 1925 |
| 1,853,936 | Small | Apr. 12, 1932 |
| 1,889,171 | Campbell | Nov. 29, 1932 |